(12) United States Patent
Ishida

(10) Patent No.: US 6,926,927 B2
(45) Date of Patent: Aug. 9, 2005

(54) METHOD OF PREPARING ULTRA FINE PARTICLE OF METAL CHALCOGENIDE

(75) Inventor: Akito Ishida, Minou (JP)

(73) Assignee: Japan Science and Technology Corporation (JP)

( * ) Notice: Subject to any disclaimer, the term of this patent is extended or adjusted under 35 U.S.C. 154(b) by 53 days.

(21) Appl. No.: 10/182,350
(22) PCT Filed: Nov. 26, 2001
(86) PCT No.: PCT/JP01/10264
§ 371 (c)(1), (2), (4) Date: Jul. 26, 2002
(87) PCT Pub. No.: WO02/42203
PCT Pub. Date: May 30, 2002

(65) Prior Publication Data
US 2003/0003043 A1 Jan. 2, 2003

(30) Foreign Application Priority Data
Nov. 27, 2000 (JP) ........................................ 2000-358707

(51) Int. Cl.$^7$ .......................... C23C 16/00; B05D 5/12; B05D 1/12
(52) U.S. Cl. .......................... 427/250; 427/71; 427/180
(58) Field of Search .......................... 427/250, 71, 180, 427/197, 199

(56) References Cited

U.S. PATENT DOCUMENTS 6,566,665 B2 * 5/2003 Baglin et al. ............. 250/492.2
6,635,311 B1 * 10/2003 Mirkin et al. ............... 427/256

FOREIGN PATENT DOCUMENTS

| JP | 60-108339 A | 6/1985 | |
| JP | 08-024626 A | 1/1996 | |
| JP | 10-267946 A | 10/1998 | |
| WO | WO 9921934 A1 * | 5/1999 | ........... C09K/11/02 |

* cited by examiner

Primary Examiner—Timothy Meeks
Assistant Examiner—Eric B. Fuller
(74) Attorney, Agent, or Firm—The Webb Law Firm

(57) ABSTRACT

A chalcogen film is applied to an acute tip of a glass fiber and the acute tip is held in physical contact with a metal layer so as to induce diffusional reaction for generation of a metal chalcogenide nano-particle or nano-particles at the acute tip. In the case where the chalcogen film is directly applied to the acute tip, the generated nano-particle or nano-particles are transferred from the acute tip to a corresponding part of the metal layer. When a silane-adsorbed film is pre-formed on the acute tip before application of the chalcogen film, the generated nano-particle or nano-particles are fixed to the acute tip. The nano-particles are several to tens in number with very narrow distribution of particle size. Since particle size and fixed position of the nano-particle or nano-particles can be controlled with high freedom, the nano-particle or nano-particles are useful as a light-emitting or photo-detecting element.

4 Claims, 3 Drawing Sheets

METHOD OF PREPARING ULTRA FINE PARTICLE OF METAL CHALCOGENIDE

BACKGROUND OF THE INVENTION

1. Field of the Invention

The present invention relates to a method of preparing a metal chalcogenide nano-particle or nano-particles, which produces luminescence with a wavelength corresponding to particle size. Particle size of the nano-particle or nano-particles can be freely controlled, and the position where the nano-particle or nano-particles are fixed can be also freely controlled.

2. Description of the Prior Art

Metal chalcogenide, i.e. a compound of a metal such as Cd or Zn with a chalcogen such as S, Se or Te, exhibits semiconducting property and has a band gap in a visible spectral region. Accounting these features, applicability of metal charcogenide to a light-emitting or photo-detecting device has been researched and developed. A metal chalcogenide nano-particle or nano-particles for such the purpose have been chemically mass-synthesized, and fixed as a thin film on a substrate by vapor-deposition or using a proper binder for fabrication of the device.

Since a metal chalcogenide nano-particle or nano-particles have a peculiar band gap dependent on particle size corresponding to wavelength within a region from ultraviolet to visible spectrum, it is expected to provide a light-emitting or photo-detecting device, which enables selection of luminescence or photo-detection within a narrow wavelength region, by severely controlling particle size of the nano-particle or nano-particles. For instance, CdSe, one of semi-conductive metal chalcogenides, can be used as a light-emitting element which produces blue, green or red luminescence corresponding to particle size.

However, metal chalcogenide nano-particles prepared by conventional synthesis have particle size distributed in a broad range, so that its band gap unfavorably extends to a broad visible spectral region. As a result, CdSe produces white luminescence as mergence of blue, green and red lights.

In short, a metal chalcogenide prepared by conventional synthesis merely exhibits properties as aggregate of several thousand semiconductor nano-particles or more with particle size distributed in a broad range. By the way, minimization of nano-particles to tens or several nanometer order has been demanded in response to recent progress and development of semiconductor devices. The aggregate with particle size distributed in a broad range is not material suitable for such the purpose, but provision of nano-particles having function as a quantum dot is strongly demanded. In order to provide such the nano-particles, preparation of metal chalcogenide nano-particles with high freedom with respect to selection of position and particle size is necessarily requested so as to enable fixation of a nano-particle or nano-particles with a proper particle size at a proper position.

SUMMARY OF THE INVENTION

The present invention aims at provision of a metal chalcogenide nano-particle or nano-particles useful for a light-emitting or photo-detecting device with high freedom with respect to selection of position and particle size, by adoption of a diffusional reaction which occurs when metal is held in physical contact with a thin chalcogen film in an ultra-micro dimension of nanometer order.

The present invention proposes a method of preparing a metal chalcogenide nano-particle or nano-particles, wherein a thin chalcogen film is applied to an acute tip of a glass fiber, and then the acute tip is brought into physical contact with a metal layer so as to generate a metal chalcogenide nano-particle or nano-particles at the acute tip due to a diffusional reaction between the chalcogen and the metal.

A chalcogen may be directly deposited on the acute tip of the glass fiber or the acute tip of the glass fiber pre-treated with a silane coupling agent. In the case where the chalcogen directly deposited on the acute tip is held in contact with the metal layer, the metal chalcogenide nano-particle or nano-particles as the diffusional reaction product are transferred from the glass fiber to the metal layer. In the case where the chalcogen deposited on the acute tip pre-treated with the silane coupling agent is held in contact with the metal layer the metal chalcogenide nano-particle chalcogenide are fixed at the acute tip of the glass fiber.

The metal chalcogenide nano-particle or nano-particles may be fixed on a surface of a glass substrate. In this case, a metal reactive with a chalcogen is vapor-deposited on a tip of an atomic force microscope, a thin chalcogen film is deposited on a surface of a glass substrate pre-treated with silane coupling agent, and the tip of the atomic force microscope is brought into physical contact with the chalcogen film so as to induce diffusional reaction between the metal and the chalcogen. The metal chalcogenide nano-particle as the mutual diffusion product is fixed on the surface of the glass substrate. Such the process is appropriate for fixation of the nano-particle or nano-particles on an optical integrated circuit for instance.

DETAILED DESCRIPTION OF THE INVENTION

When a chalcogen film is held in physical contact with a metal film, metal chalcogenide is generated by diffusional reaction between the chalcogen and the metal. The chalcogen may be Se, Te or S, while the metal may be Cd or Zn.

According to the present invention, a scanning probe microscope is used for defining a reaction field for generation of metal a chalcogenide nano-particle or nano-particles to an ultra-micro dimension nearly equal to particle size of the nano-particle or nano-particles at a proper position. Due to use of such the scanning probe microscope, a chalcogenide nano-particle or nano-particles can be generated with high freedom on position as well as particle size. Especially, a near-field scanning optical microscope, which is provided with a sharpened glass fiber as a tip, enables fixation of a chalcogenide nano-particle or only a few nano-particles at the sharpened tip, suitable for precision instrument applicable to various spectrometry and measurement.

In practice, a tip of a glass fiber 1 is sharpened by chemical etching, the acute tip 2 is coated with a thin chalcogen film 3 of from several to tens nanometers in thickness. The coated tip 2 is used as a tip of a scanning probe microscope, as shown in FIGS. 1A and 1B.

A chalcogen film 3 directly deposited on the glass fiber 1 is less affinitive with glass, resulting in poor strength and adhesiveness between the glass fiber and the chalcogen film. Due to poor strength and adhesiveness, the chalcogen film 3 is easily peeled off the glass fiber 3 before or during diffusional reaction with a metal.

Figure 1A:
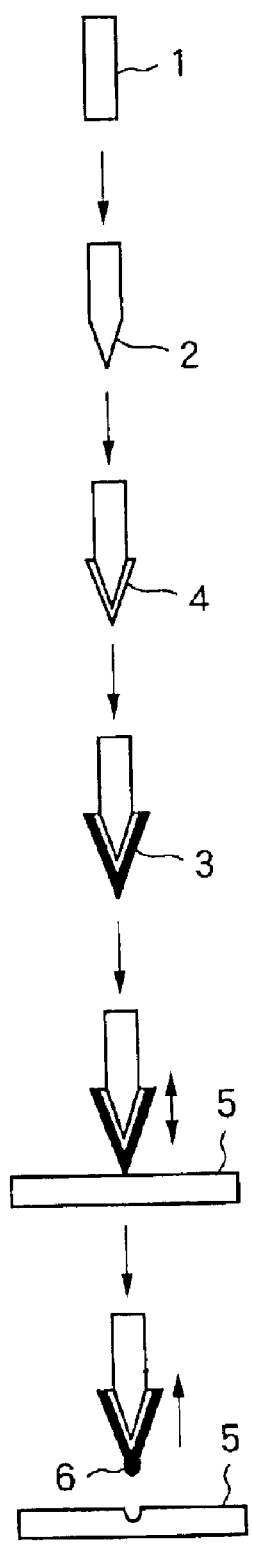
FIG. 1A is a flow chart for explaining fixation of a metal chalcogenide nano-particle or nano-particles on an acute tip of a glass fiber.
Figure 1B:
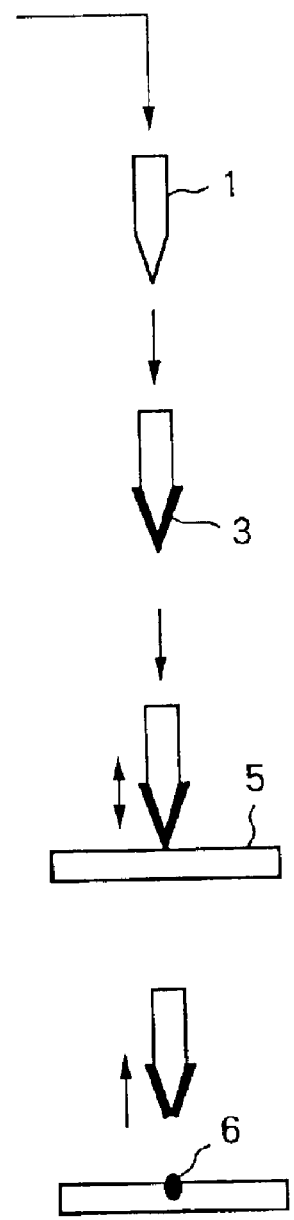
FIG. 1B is a flow chart for explaining fixation of a metal chalcogenide nano-particle or nano-particles on a surface of a metal film.
Figure 2:
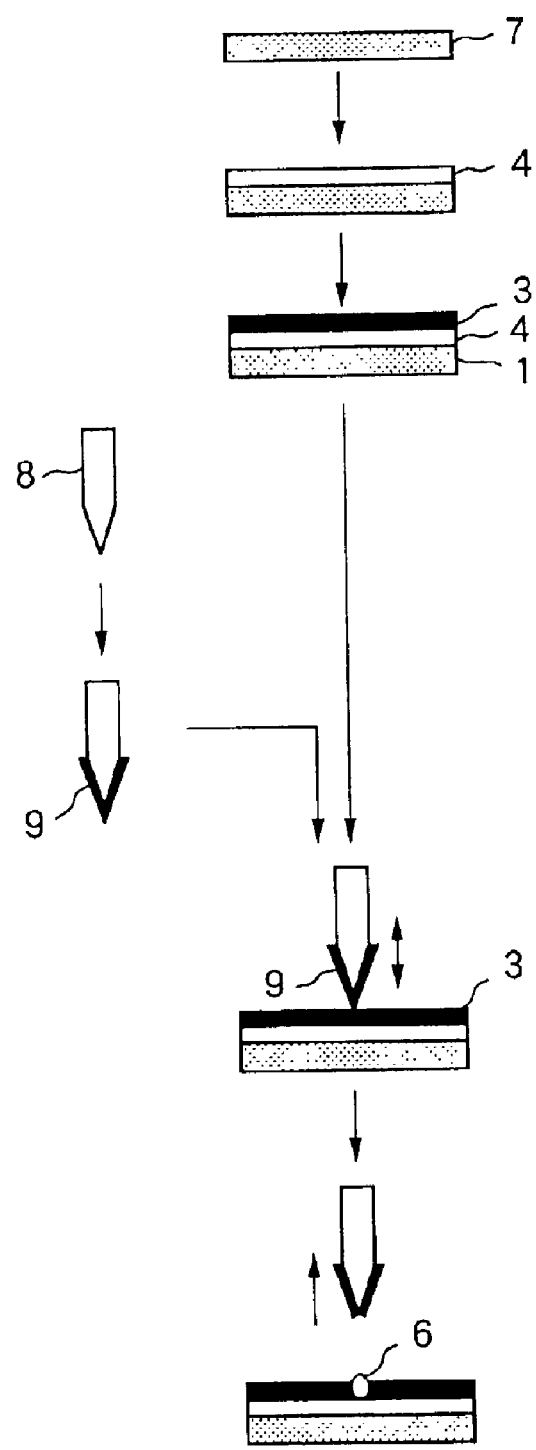
FIG. 2 is a flow chart for explaining fixation of a metal chalcogenide nano-particle or nano-particles on a glass substrate.

When a tough chalcogen film 3 is necessary, the acute tip 2 of the glass fiber 1 is pre-treated with a silane coupling agent, e.g. mercaptopropyl triethoxysilane, much affinitive with chalcogen, as shown in FIG. 1A. Any kind of silicon analogues may be used as a silane coupling agent, as far as a mercapto group is added to a terminal or side-chain of its molecule.

A silane film 4 is adsorbed on the acute tip 2 of the glass fiber 1 pretreated with the silane coupling agent. When the acute tip 2 of the glass fiber 1 coated with the silane film 4 is held in physical contact with a chalcogen, the chalcogen is firmly bonded to glass by chemical reaction. As a result, a tough chalcogen film 3 is applied to the glass fiber 1. Deposition of a chalcogen is representatively performed by a dipping process. Vapor-deposition or sputtering technique is also adoptable, as far as a thin film of from several to tens nanometers in thickness can be formed.

In the dipping process, a chalcogen-saturated carbon disulfide solution is prepared by pre-dissolving a chalcogen in carbon disulfide with great solubility to chalcogen, and an acute tip 2 of a glass fiber 1 is dipped in the saturated solution. After the glass fiber 1 is raised from the saturated solution, carbon disulfide is gradually transpired so as to form a chalcogen film 3 on the acute tip 2 of the glass fiber 1. Since the chalcogen film 3 is easily oxidized, all the steps shall be carried out in a nitrogen atmosphere.

A tip 2 coated with a chalcogen film 3 is attached to a scanning probe microscope. The tip 2 is gradually brought close to a surface of a metal layer 5 while being fed back by an atomic or shearing force, and then fixed at the position where the tip 2 is held in physical contact with the metal layer 5. While the tip 2 is kept in physical contact with the metal layer 5 for a time period from a several minutes to a several hours, diffusional reaction occurs between the chalcogen and the metal. An area of the chalcogen film 3 in contact with the metal layer 5 can be controlled to a small value from several to several hundreds nanometers, by using the tip 2 which is sharpened with a radius of curvature of from several to tens nanometers. Due to definition of the contact to a very tiny area, a metal chalcogenide nano-particle or nano-particles 6 generated by the chemical reaction are very small of from several to tens nanometers in diameter, and a number of the metal chalcogenide nano-particles 6 is controlled to a value of from several to tens.

Use of a glass fiber 1 having an acute tip 2 with a radius of curvature of several nanometers enables generation of a single metal chalcogenide nano-particle 6. In this case, position of the glass fiber 1 is preferably controlled by an atomic force microscope, since the acute tip 2 is kept in contact with the metal layer 5 with high dimensional accuracy. Of course, a horizontal stage for a conventional optical microscope may be used instead of the atomic force microscope, for generation of aggregate comprising nano-particles 6 of from several to tens in number.

Chemical reaction for generation of metal chalcogenide is induced by mutual diffusion between a chalcogen and a metal, so that particle size of a metal chalcogenide nano-particle or nano-particles 6 can be also controlled by a time period for keeping the tip 2 in physical contact with the metal in addition to a radius of curvature of the tip 2. In actual, much smaller metal chalcogenide nano-particles 6 are generated by pulling the glass fiber 1 apart from the metal layer 5 at the reaction field before completion of the chemical reaction. When the glass fiber 1 is pulled apart from the metal layer 5 earlier than completion of the chemical reaction, un-reacted chalcogen remains around generated metal chalcogenide. Such the un-reacted chalcogen is easily washed off, since it is oxidized to chalcogen acid by oxygen in the atmosphere.

A metal chalcogenide nano-particle or nano-particles 6 fixed to the acute tip 2 of the glass fiber 1 produce luminescence with a certain wavelength by excitation with near-ultraviolet light injected through the glass fiber 1 or from the outside. Due to the luminescence, the metal chalcogenide-attached tip 2 is useful as a tip of a near-field scanning optical microscope. A micro-sensor is also provided by further modifying a surface of the tip 2 with functional material such as various ions or ion- or molecule-selective films.

A glass fiber 1 having an acute tip 2, on which a chalcogen is deposited without pretreatment using a silane coupling agent, is also useful for generation of a metal chalcogenide nano-particle or nano-particles 6, as shown in FIG. 1B. When such the tip 2 is held in contact with a metal layer 5 by the same way, the generated metal chalcogenide nano-particle or nano-particles 6 peel off the acute tip 2 and remain on the metal layer 5 during pulling the glass fiber 1 apart from the metal layer 5 due to big difference in lattice constant between the metal chalcogenide and the original chalcogen as well as poor affinity between the glass and the metal chalcogenide. Presence of the metal chalcogenide nano-particle or nano-particles 6 on the metal layer 5 means selective fixation of the metal chalcogenide nano-particle or nano-particles 6 at a defined position of the metal layer 5. In this case, a number and particle size of the metal chalcogenide nano-particles 6 are also properly controlled by a radius of curvature of the acute tip 2 and a time period for keeping the acute tip 2 in physical contact with the metal layer 5.

A metal, which is held in physical contact with an acute tip 2 of a glass fiber 1, may be not only a bulk metal but also a thin Zn or Cd film or dot of from several to tens nanometers in size of a circuit pre-fabricated on a silicon substrate or a light waveguide pre-fabricated on a substrate such as Au, Ag, Cu, Al or Si.

A metal chalcogenide nano-particle or nano-particles of from several to tens in number are fixed to a defined position of a circuit, waveguide, minute liquid passage or the like useful as an optical integrated circuit for communication, an electro-luminescence device for display, and a micro-sensor for clinical analysis, etc. A glass fiber 1 having a sharpened tip 2 is not always necessary, but an acute tip of a conventional atomic force microscope may be also used for the purpose. In this specification, the wording "an acute tip 2" includes such an acute tip of a conventional atomic force microscope.

A metal chalcogenide nano-particle or nano-particles 6 can be generated and fixed on a surface of glass by vapor depositing a metal such as Cd or Zn, which is reactive with chalcogen, on a tip and then reacting the deposited metal with a chalcogen film applied to a surface of a glass substrate pre-treated with a silane coupling agent.

In concrete, a glass substrate 7 is treated with a silane coupling agent such as mercaptopropyl trimethoxysilane, and then a thin chalcogen film 3 is applied through an adsorbed silane film 4 to the glass substrate 7. A metal layer 9 is formed on a tip of an atomic force microscope 8 by vapor deposition of Cd or Zn. When the metal layer 9 is held in physical contact with the chalcogen film 3 while adjusting contact pressure by the atomic force microscope 8, a metal chalcogenide nano-particle or nano-particles 6 are generated by diffusional reaction between the metal and the chalcogen. Particle size of the metal chalcogenide nano-particle or nano-particles 6 can be varied in response to a time period for the diffusional reaction. The generated metal chalcogen nano-particle or nano-particles 6 are separated from the metal layer 9 and fixed on the chalcogen film 3.

The other features of the present invention will be apparent from the following example with attached drawings.

A single-mode optical fiber of 125 $\mu$m in diameter with cut-off wavelength of 488 nm was chemically etched with hydrogen fluoride by a protection layer process using toluene in order to sharpen a tip of the optical fiber. The etched tip of the optical fiber was with an angle of 30 degrees and a radius of curvature of 200 nm.

Amorphous selenium of several nanometers in particle size was added to carbon disulfide, and the mixture was then violently stirred in a magnetic stirrer to prepare a Se-saturated solution. The acute tip of the optical fiber was pre-treated with a silane coupling agent and dipped in the Se-saturated solution. Thereafter, the tip was raised from the Se-saturated solution and held as such in a nitrogen atmosphere for 12 hours to evaporate carbon disulfide from its surface. A red Se film was noted on the surface of the tip by observation of the optical fiber after the evaporation.

The tip of the optical fiber coated with the Se film was brought into contact with a surface of a Cd layer, using a horizontal stage of an optical microscope. The tip of the optical fiber was held as such for 5 hours to promote solidus diffusion between Se and Cd. In this way, CdSe nano-particles were generated and fixed to the tip of the optical fiber.

Figure 3:
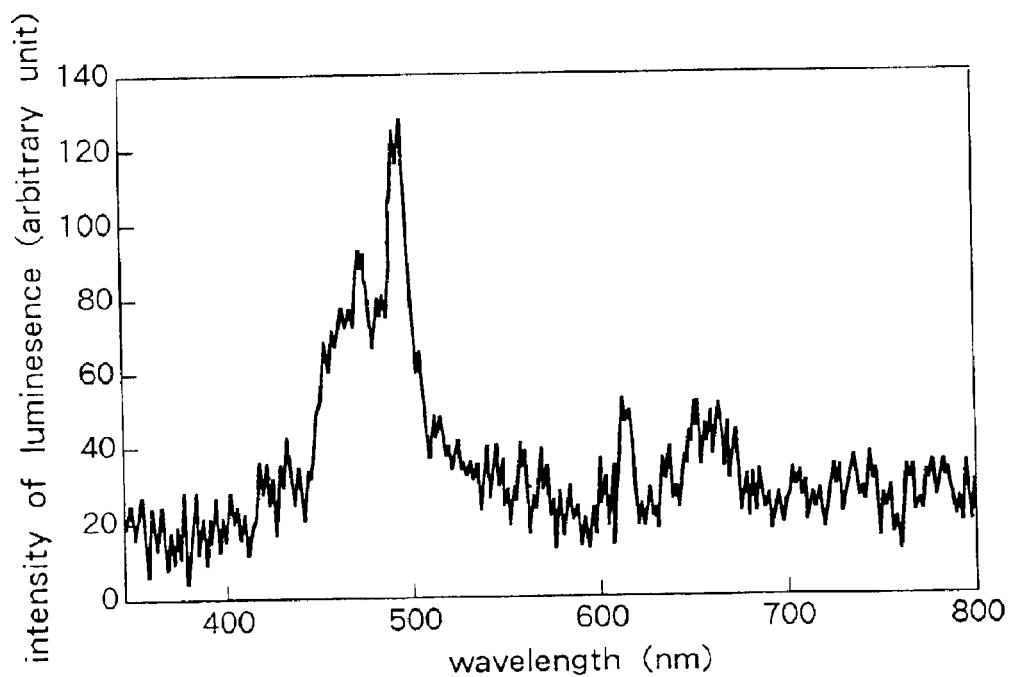
FIG. 3 is a graph illustrating luminescent spectrum of CdSe nano-particles fixed on an acute tip of a glass fiber.

The tip of the optical fiber, to which CdSe nano-particles had been fixed, was set on a stage of a fluorescent microscope. Luminescence of the CdSe nano-particles was observed by a CCD (charge coupled device) spectrometer cooled with liquid nitrogen, while the CdSe nano-particles was being excited with nitrogen laser of 337 nm in wavelength. Luminescent spectrum was limited to green light with wavelength in a very narrow region, as noted observation results shown in FIG. 3. Such the luminescent spectrum proves that generated nano-particles were well uniform in particle size near monodispersity.

According to the present invention as above-mentioned, a chalcogen deposited on an acute tip of a glass fiber is kept in contact with metal, so as to enable contact of the chalcogen with the metal at a very tiny area of from several to tens square nanometers. Due to the defined contact area, it is possible to control particle size of a metal chalcogenide nano-particle or nano-particles as a diffusional reaction product between the chalcogen and the metal and also position of the generated metal chalcogenide nano-particle or nano-particles. Since particle size of the nano-particle or nano-particles generated and fixed in this way is distributed in a very narrow range, the metal chalcogenide nano-particle or nano-particles produce peculiar luminescence corresponding to the particle size. Consequently, the metal chalcogenide nano-particle or nano-particles are useful as a light-emitting device, fluorescent-labeled material, microsensor or the like in various industrial fields such as optical communication, optical computing, fluorescence spectroscopy, biochemistry and clinical analysis.

What is claimed is:

1. A preparation method of a metal chalcogenide nano-particle or nano-particles, which comprises the steps of:
   defining a reaction site between a chalcogen and a metal to an acute tip of a glass fiber;
   applying a chalcogen as a thin film to the acute tip of the glass fiber;
   forming a metal film on a substrate; and
   holding said acute tip in physical contact with the metal film,
   whereby a metal chalcogenide nano-particle or nano-particles are generated at said acute tip of said glass fiber by diffusional reaction between said chalcogen and said metal.

2. The preparation method defined by claim 1, wherein the acute tip of the glass fiber is pre-treated with a silane coupling agent before application of the chalcogen film, so as to fix the generated metal chalcogenide nano-particle or nano-particles at the acute tip of the glass fiber.

3. The preparation method defined by claim 1, wherein the chalcogen film is directly applied to the acute tip of the glass fiber, so as to transfer the generated metal chalcogenide nano-particle or nano-particles from the acute tip of the glass fiber to the metal surface.

4. A preparation method of a metal chalcogenide nano-particle or nano-particles, which comprises the steps of:
   defining a reaction site between a chalcogen and a metal to an acute tip of an atomic force microscope;
   vapor-depositing a metal, which is reactive with chalcogen, at the acute tip of the atomic force microscope;
   applying a chalcogen as a film to a surface of a glass substrate pre-treated with a silane coupling agent; and
   holding said tip of said atomic force microscope in physical contact with said chalcogen film so as to induce diffusional reaction between the metal and the chalcogen,
   wherein a metal chalcogenide nano-particle or nano-particles as a diffusional reaction product are fixed to a surface part of said glass substrate.

* * * * *